United States Patent Office 3,291,633
Patented Dec. 13, 1966

3,291,633
REFLECTORIZING GLASS SPHERES AND
METHOD OF MAKING THEM
Samuel E. Wissinger, Jr., Huntingdon, Pa., assignor to Prismo Safety Corporation, Huntingdon, Pa., a corporation of Pennsylvania
No Drawing. Filed May 16, 1963, Ser. No. 281,028
12 Claims. (Cl. 117—100)

The present invention relates to the manufacture of reflectorizing glass spheres and more particularly to internally reflecting glass spheres and the method of making such spheres.

The reflectorizing glass spheres in accordance with the present invention are small glass spheres which have been fractured and coated so as to yield spheres which hold together but which reflect light from within the spheres regardless of the index of refraction due to the fractures within the spheres which act like little facets for reflecting light in the same fashion as a cut diamond reflects light.

Heretofore, clear transparent glass spheres have been manufactured from glass having a relatively high index of refraction of approximately 2.0 which reflected light from within the spheres. For lower index glass spheres reflectivity is imparted to the spheres by coating the lower surfaces with a reflective material or partially embedding the glass spheres in a reflecting material.

According to the present invention, glass spheres are produced which reflect light from within the spheres irrespective of the refractive index of the glass.

It is therefore an object of the present invention to provide a method of making internally reflecting glass spheres.

It is a further object of the present invention to provide internally reflecting glass spheres which are useful for reflectorizing purposes.

A still further object of the present invention is to provide improved reflectorizing markers made with the internally reflecting glass spheres of this invention.

Other objects and the nature and advantages of the instant invention will be apparent from the following description.

The internally reflecting glass spheres containing a plurality of fractures therein and coated with a bonding agent are obtained by producing internal stresses and strains in the glass by a sudden change in temperature while simultaneously coating the spheres with a bonding agent. The glass spheres are heated to a relatively high temperature, lower than the melting point of the glass, after which the spheres are immersed in a cold bonding liquid. The cold bonding liquid serves a two-fold purpose. It acts to chill the hot glass spheres and also to coat the fractured spheres resulting from the chilling with a transparent bonding coating which may be colored or colorless.

The temperature to which the glass spheres are heated is in the range of 500–1500° F. Preferably the spheres are heated to the desired range in 1–30 minutes. The temperature of the cold bonding liquid is preferably below room temperature and good results have been obtained at chilling temperatures of 32–45° F. The spheres are allowed to remain in the chilling and bonding liquid until they are cooled to approximately room temperature and are completely coated. The fractured and coated spheres are then removed from the cold bonding liquid and are rinsed with water and dried.

The cold bonding liquid is a mixture of transparent material and water which acts to bond the fractured glass together by a chemical bond. Examples of suitable bonding materials are methacrylatochromic chloride, and various silanes such as vinyl trichlorosilane hydrolyzed by acetone, sodium vinyl siliconate, ethyl silicates, vinyltriethoxysilane, and the like.

The materials suitable for use as bonding agents are generally known as coupling agents for glass and are those agents now utilized for increasing the adhesion between glass and plastic materials. In some cases the mixture with water is a solution and in other cases it is an emulsion.

A coloring agent can also be incorporated in the bonding liquid when a colored transparent coating is desired.

The use of the bonding material in the chilling liquid is essential since it has been found that in the absence of the bonding material, the fractured glass crumbles into small pieces, losing its spherical shape.

The bonding material forms a coating on the glass spheres and between the fractures therein which is in the nature of a chemical bond and which holds the fractured spheres together during subsequent use.

The following example is illustrative of the present process and should not be construed as limiting the scope of the invention:

*Example*

Small glass spheres having an average diameter of 25 mils were heated to a temperature of 1200° F. for 5 minutes. The glass spheres are then poured into a cold bonding liquid having a temperature of 40° F. This solution was made up of 100 parts of methacrylato chromic chloride commercially obtained under the trade name, Volan, diluted with 4680 parts of water. The spheres were removed from the cold liquid and appeared to have a deep blue cast to them. The spheres were rinsed slightly until the blue cast disappeared. The spheres were then dried and were found to have a plurality of internal fractures and a uniform outer coating thereon. The spheres did not crumble during handling and shipment.

Excellent reflectivity was obtained when such fractured glass spheres were partially or totally immersed in a transparent binder.

The glass spheres which may be treated in accordance with the present invention can be of a size in the range of 3–100 mils and of the type normally used for reflectorizing road markers, signs, road stripes, and the like.

A reflectorizing paint can be made by pre-mixing these internally reflecting glass spheres in a transparent binder. It is also possible to obtain a reflectorized colored line by partially embedding these internally reflecting glass spheres in a pigmented binder.

It will be obvious to those skilled in the art that various changes may be made without departing from the spirit of the invention and therefore the invention is not limited to what is shown in the drawings and described in the specification but only as indicated in the appended claims.

What is claimed is:

1. A method of manufacturing internally reflecting glass spheres for use in reflectorized markers comprising heating small glass spheres of a size normally used for reflectorizing purposes to a temperature slightly below the melting point of the spheres, pouring the hot spheres into a cold bonding liquid, said liquid having a temperature below room temperature, said liquid comprising a dilute mixture of a transparent bonding agent with water, said bonding agent being a coupling agent for glass and synthetic plastic materials, whereby said hot spheres upon being immersed in said cold bonding liquid simultaneously become fractured internally and coated externally by said transparent bonding agent.

2. A method according to claim 1 wherein said bonding agent is methacrylato chromic chloride.

3. A method according to claim 2 wherein said spheres are heated to a temperature in the range of 500–1500° F. and wherein said cold bonding liquid has a temperature in the range of 32–45° F.

4. A method according to claim 1 wherein said bonding agent is a silane.

5. A method according to claim 1 wherein said bonding liquid includes a coloring agent whereby the external coating on the spheres is a colored transparent coating.

6. An internally reflecting glass sphere suitable for use in reflectorized markers comprising a small glass sphere having a diameter in the range of 3–100 mils, said sphere having a plurality of internal fractures and an outer transparent coating on said sphere of a bonding agent which prevents it from fracturing into small pieces, said bonding agent bonding with the glass sphere and being a coupling agent for glass and synthetic plastic materials.

7. A glass sphere in accordance with claim 6 wherein said coating material is methacrylato chromic chloride.

8. A glass sphere in accordance with claim 6 wherein said coating material is a silane hydrolyzed by acetone.

9. A glass sphere in accordance with claim 8 wherein said coating material is vinyl trichlorosilane hydrolyzed by acetone.

10. A glass sphere in accordance with claim 8 wherein said coating material is ethyl silicate.

11. A glass sphere in accordance with claim 8 wherein said coating material is vinyl triethoxysilane.

12. A glass sphere in accordance with claim 6 wherein said outer coating on said sphere is a transparent colored coating.

References Cited by the Examiner

UNITED STATES PATENTS

| | | | |
|---|---|---|---|
| 2,406,977 | 2/1949 | Davis et al. | 65—21 |
| 2,542,134 | 2/1951 | Gregory | 65—111 |
| 2,574,972 | 11/1951 | Hill | 65—21 |
| 2,713,286 | 7/1955 | Taylor | 65—21 |
| 3,005,790 | 10/1961 | Wynn et al. | 65—21 |
| 3,079,361 | 2/1963 | Plueddeman | 117—124 |
| 3,130,070 | 4/1964 | Potters et al | 117—124 |
| 3,164,645 | 1/1965 | DeVries et al. | 65—21 |

DONALL H. SYLVESTER, *Primary Examiner.*

G. R. MYERS, *Assistant Examiner.*